US010438406B2

(12) United States Patent
Younas et al.

(10) Patent No.: US 10,438,406 B2
(45) Date of Patent: Oct. 8, 2019

(54) MEDIAL AXIS EXTRACTION FOR COMPLEX 3D OBJECTS

(71) Applicant: University of Manitoba, Winnipeg (CA)

(72) Inventors: Sohail Younas, Winnipeg (CA); Chase R. Figley, Winnipeg (CA)

(73) Assignee: University of Manitoba, Winnipeg (CA)

( * ) Notice: Subject to any disclaimer, the term of this patent is extended or adjusted under 35 U.S.C. 154(b) by 0 days.

(21) Appl. No.: 15/845,205

(22) Filed: Dec. 18, 2017

(65) Prior Publication Data

US 2018/0276887 A1 Sep. 27, 2018

Related U.S. Application Data

(60) Provisional application No. 62/435,311, filed on Dec. 16, 2016.

(51) Int. Cl.
*G06T 15/00* (2011.01)
*G06T 17/20* (2006.01)
(Continued)

(52) U.S. Cl.
CPC ............... *G06T 17/20* (2013.01); *G06T 7/12* (2017.01); *G06T 7/155* (2017.01); *G06T 19/00* (2013.01);
(Continued)

(58) Field of Classification Search
CPC ....... G06T 17/20; G06T 7/149; G06F 3/1256; G06F 3/1211; G06K 9/34
(Continued)

(56) References Cited

U.S. PATENT DOCUMENTS 6,956,565 B2 * 10/2005 Bloomenthal ............ G06T 7/60
345/419
7,177,480 B2 * 2/2007 Ikeda ....................... G06K 9/48
345/619

(Continued)

OTHER PUBLICATIONS

Telea, Alexandru, and Andrei Jalba. "Computing Curve Skeletons from Medial Surfaces of 3D Shapes." In TPCG, pp. 99-106. 2012.*
(Continued)

*Primary Examiner* — Phu K Nguyen
(74) *Attorney, Agent, or Firm* — Kyle R Satterthwaite; Ryan W Dupius; Ade & Company Inc

(57) ABSTRACT

A novel methodology for computing the medial axis/skeleton of a discrete binary object using a 'divide and conquer' algorithm, in which any 3D object is first sliced into a series of 2D images in X, Y and Z directions. Then, a geometric (Voronoi) algorithm is applied on each 2D image to extract the respective medial axis. This information is then combined to reconstruct the medial axis of the original 3D object using an intersection technique. An optional 3D interpolation step to achieve continuous connected skeletons uses Delaunay triangles and a spherical search to establish the nearest neighboring points in 3D space to interpolate between. Test results show that the proposed 3D Voronoi and optional interpolation algorithms are able to accurately and efficiently extract medial axes for complex 3D objects as well. Finally, an axis-smoothing algorithm using the same Delaunay triangle and spherical test is operable to remove unwanted noise from the extracted medial axis.

20 Claims, 13 Drawing Sheets

(51) Int. Cl.
    *G06T 19/00*    (2011.01)
    *G06T 7/12*     (2017.01)
    *G06T 7/155*    (2017.01)
(52) U.S. Cl.
    CPC .............. *G06T 2207/20041* (2013.01); *G06T 2207/20044* (2013.01); *G06T 2219/008* (2013.01)
(58) Field of Classification Search
    USPC ........................................................ 345/419
    See application file for complete search history.

(56) References Cited

U.S. PATENT DOCUMENTS

| | | | | |
|---|---|---|---|---|
| 8,041,141 B2* | 10/2011 | Farag | ......................... | G06T 7/64 345/424 |
| 8,565,479 B2* | 10/2013 | Gurman | ............. | G06K 9/00201 382/103 |
| 8,913,060 B2* | 12/2014 | Kassab | ................. | G06T 7/0012 345/424 |
| 9,235,753 B2* | 1/2016 | Gurman | ............. | G06K 9/00201 |
| 9,916,684 B2* | 3/2018 | Goel | ....................... | G06T 17/00 |
| 9,965,592 B2* | 5/2018 | Kakadiaris | .............. | G06F 19/00 |
| 9,978,173 B2* | 5/2018 | Goel | ....................... | G06T 17/00 |

OTHER PUBLICATIONS

Garcia, Frederic, and Björn Ottersten. "Real-time curve-skeleton extraction of human-scanned point clouds." International Conference on Computer Vision Theory and Applications (VISAPP 2015). 2015.*

Tagliasacchi, Andrea, Hao Zhang, and Daniel Cohen-Or. "Curve skeleton extraction from incomplete point cloud." ACM Transactions on Graphics (TOG). vol. 28. No. 3. ACM, 2009.*

Giesen, Frédéric Cazals-Joachim. "Delaunay Triangulation Based Surface Reconstruction: Ideas and Algorithms." (2004).*

* cited by examiner (a)

(b)

(c)

(d)

(a)

(b)

(c)

MEDIAL AXIS EXTRACTION FOR COMPLEX 3D OBJECTS

CROSS-REFERENCE TO RELATED APPLICATIONS

This application claims benefit under 35 U.S.C. 119(e) of U.S. Provisional Application No. 62/435,311, filed Dec. 16, 2016, the entirety of which is incorporated herein by reference.

BACKGROUND

The medial axis (or "topological skeleton") of an object, first described by Blum [1], can be defined as the set of points within the object that are equidistant from two or more closest points along the object's boundary. An accurate skeleton is a highly efficient way to represent the topology of 2D or 3D objects in a compact way [2][3] and has been widely used in various fields such as image processing and analysis, video graphics, character reconstruction, recognition and matching [4][5].

Extraction of the medial axis or medial axis transform (MAT) for 2D/3D object has typically fallen in one of the following three categories [6]: 1) boundary removal, 2) distance map suppression, or 3) geometric methods.

Boundary removal, also known as morphological thinning [7][8][9], is an iterative process of removing the boundary of an object, starting from the outside and moving toward the center. Different thinning algorithms have been described [10], but most of these are an approximation of the grassfire process [11] that work like peeling an onion to reach its core. All pixels/voxels are removed except those whose removal affects the topology of an object [12][13]. However, there are several drawbacks to this approach. The processing time increases rapidly with the size of the object because each pixel/voxel must be evaluated independently [14]; and both the accuracy of the estimated skeleton and the processing time depend critically on how many neighboring pixels (e.g., 4 vs. 8) or voxels (6 vs. 24) are considered during the thinning process [1][15]. Generally speaking, accounting for more neighboring pixels/voxels, yields a more accurate representation of the medial axis, but including more neighbors means that processing time will also increase. Also different thinning algorithms produce different skeletons when applied to the same image [10]. And finally, because it is an iterative process, an appropriate stopping criteria needs to be defined a priori, which may not be trivial.

On the other hand, distance transforms (DT) can be used to extract the medial axis by creating a distance map of an object [16][17]. The distance map is created by assigning each pixel of an object a value that is determined by its distance to the closest boundary [18], based on a predetermined distance calculation method (e.g., Euclidean [19], chessboard [20], city block [19] etc.). After creating the distance map, the medial axis is then extracted by suppressing pixels with a non-maximum distance [15], since (by definition) pixels in the middle have the largest distance from the boundary. This process is also known as ridge detection [21], and is done using local/global adaptive thresholding approaches or gradient-based methods. This is a relatively fast and simple process compared to boundary removal. However, the main drawback is that the resulting medial axis may not be one-pixel thin, or that holes/discontinuities can sometimes appear in the resulting skeleton.

Finally, medial axes can be extracted using geometry-based algorithms such as Voronoi diagrams [22][23][24][25], where the original object is first divided into polygons and the centers of those polygons are subsequently determined using maximal disks. Skeletonization based on Voronoi diagrams is very robust, and often produce skeleton having one-pixel thin, continuous, and maintain the topology description. The Voronoi method also has the advantage of being computationally efficient, and is therefore faster than boundary removal or distance transform methods for large and/or complex objects [26]. The primary drawback of this approach is that the extracted skeleton may contain additional/redundant information due to the presence of noise; however, this can be removed using various pruning methods [27][28][29]. The main pipeline or workflow for all the three categories are shown in FIG. 1.

According to the definition of Voronoi diagram, the space S between two points $p_1$ and $p_2$ is equally divided with the help of the bisector E, that passes perpendicularly at the center of the line segment joining points $p_1$ and $p_2$ [30][31], as shown in FIG. 2(a). Similarly, space S having many points P (also called sites) can be equally divided into Voronoi regions (also called Voronoi cells) among these points P. Each Voronoi cell, which is a convex polygon, will have only one site within it and any points on its boundaries, called Voronoi edges, are equidistant from exactly two sites. Intersection of three Voronoi edges will give rise to a Voronoi vertex, which is equidistant from exactly three sites. Thus, a Voronoi diagram is the final result of partitioning an object into Voronoi cells.

Different algorithm can be used in order to calculate the Voronoi diagram of n sites. These algorithms include a lower bound [32][33], incremental construction [34] whose efficient implementation was done by Ohya [35] and Sugihara [36], divide & conquer [37] and a well-known sweep algorithm [38].

Assuming that there is only one object present in the image whose medial axis is being extracted, all points of the medial axis are centered with respect to the boundaries of that object. Therefore, before the Voronoi diagram can be generated, the object boundaries must be identified. Different edge detectors (e.g. sobel or canny or any other edge operator, details can be found in [39]) can be used in order to detect the boundary of an object within the image. Then, once the boundary of the object has been identified, the space can be divided into Voronoi cells (as described above).

The raw Voronoi skeleton of an object contains branches that are clearly outside of the object's boundaries, but still within the image. These branches/segments do not have any significant value, as these are segments of unbounded polygons (as described above). Therefore, initial cleaning has to be done to remove all of the segments that lie outside the object's boundaries.

Due to the presence of noise in the boundary information, the resulting Voronoi diagram of an object may not be considered a medial axis if it contains spurious branches. Therefore, pruning—i.e., the process of determining whether a specific branch of the skeleton is redundant or not, and if so, removing the redundant segment—may be necessary to remove these spurious branches and to extract the true medial axis. The pruning process implemented in this paper compares the Euclidean distance between two sites with their contour distance along the boundary, as explained below [22].

Each Voronoi edge, a branch of the raw skeleton, is equidistant from exactly two sites ($p_1$ & $p_3$) as mentioned earlier. These two sites can provide information about the Euclidean distance ($dist_E$) and contour distance ($dist_C$) between them. The Euclidean distance between two points ($p_1$ & $p_2$) having spatial coordinates ($x_1,y_1$) and ($x_2,y_2$) respectively, is calculated using following equation.

$$dist_E = \sqrt{(x_1-x_2)^2 + (y_1-y_2)^2} \quad (2.1)$$

The Euclidean distance serves as the diameter for the maximal disk $D_c$, which can fit between those two sites ($p_i$ & $p_j$) having these sites on its circumference. The area ($D_A$) and the circumference ($D_c$) of this maximal disk can be calculated using following equations:

$$D_A = T \cdot \left(\frac{dist_E}{2}\right)^2 \quad (2.2)$$

$$D_C = 2T \cdot \left(\frac{dist_E}{2}\right) \quad (2.3)$$

where T is a control parameter with values less than, equal to, or greater than $\pi$ (e.g., $\pi/3$, $\pi/2$, $2\pi/3$, $\pi$, $3\pi/2$, $2\pi$, $3\pi$, etc.). The effects of varying the magnitude of the control parameter are demonstrated in experimental results found herein below.

The contour distance is the distance between two points while moving along the boundary of an object as shown in FIG. 3. There are two pathways to calculate the contour distance between two points while moving along the boundary. The minimum of the two contour distances is selected. Both the distances ($dist_E$ & $dist_c$) are shown in FIG. 3.

$$dist_c = \min(dist_{c1}, dist_{c2}) \quad (2.4)$$

The Voronoi edge is considered to be spurious if the contour distance ($dist_c$) is less than the circumference $D_C$ of the maximal disk with a diameter equal to the Euclidean distance, such that:

$$\text{Voronoi edge} = \begin{cases} \text{spurious} & dist_c < D_C \\ \text{not spurious} & \text{otherwise} \end{cases} \quad (2.5)$$

FIG. 3 demonstrates how an edge is decided spurious or not. $Edge_x$, $edge_y$ and $edge_z$ are equidistant from sites ($p_1$ & $p_2$), ($p_3$ & $p_4$) and ($p_5$ & $p_6$), respectively. For $edge_x$ and $edge_y$, the minimum of their respective contour distance $dist_c$ is larger than then circumference of the circle having diameter equal to their respective sites' Euclidean distance. Therefore, these edges are not considered to be spurious and are not eliminated from the final accurate skeleton. However, the minimum contour distance for $edge_z$ is less than the circumference of the circle containing ($p_5$ & $p_6$), so this edge is considered spurious and is excluded from the final skeleton. After checking all the Voronoi edges, the refined skeleton is created as shown in FIG. 4.

In accordance with the forgoing, the procedure for medial axis extraction of a 2D image is briefly summarized below, with reference to the block diagram shown in FIG. 5.

Step 1: Generate binary image.
Step 2: Boundary detection.
Step 3: Raw skeleton using Voronoi diagram algorithm.
Step 4: Initial cleaning process.
Step 5: Pruning of raw skeleton.
 5.1: Pick Voronoi edge.
 5.2: Find its corresponding sites.
 5.3: Calculate the $dist_c$ and $D_c$.
 5.4: Check for spurious edge using equation 5.
 5.5: Refine the raw skeleton.

Step 6: Continue step 4 for all edges and generate medial axis.

While the forgoing process is useful for deriving the medial axis for a 2D image, it is not directly applicable to determine the medial axis for a 3D object. It is in relation to this problem that Applicant has developed a unique process that builds on the forgoing principles to find the medial axis of a 3D object.

SUMMARY OF THE INVENTION

According to a first aspect of the invention there is provided a method of determining, using one or more computers, a 3D medial axis of a virtual 3D object occupying a virtual 3D Cartesian space, said method comprising:
 (a) in any order, by said one or more computers,
  (i) slicing through said virtual 3D object in a row direction parallel to a reference X-Z plane of said 3D Cartesian space at points along a Y-axis of said virtual 3D Cartesian space to generate a plurality of 2D images in X-Z planes, and determining respective X-direction medial axes for said 2D images in the X-Z planes;
  (ii) slicing through said virtual 3D object in a column direction parallel to a reference Y-Z plane of said 3D Cartesian space at points along an X-axis of said virtual 3D Cartesian space to generate a plurality of 2D images in Y-Z planes, and determining respective Y-direction medial axes for said 2D images in the Y-Z planes; and
  (iii) slicing through said virtual 3D object in a depth direction parallel to a reference X-Y plane of said 3D Cartesian space at points along a Z-axis of said virtual 3D Cartesian space to generate a plurality of 2D images in X-Y planes, and determining respective Z-direction medial axes for said 2D images in the X-Y planes;
 (b) by said computer, determining at least one common skeleton based at least partly on points of intersection between the X-direction medial axes, Y-direction medial axes and/or Z-direction medial axes.

In a second aspect of the invention, non-transitory computer-readable memory stores statements and instructions configured for execution by one or more processors of said one or more computers to perform steps (a) and (b).

In a third aspect of the invention, a system comprises one or more computers having one or more processors and non-transitory computer readable memory coupled thereto, said non-transitory computer readable memory having stored thereon statements and instructions configured for execution by one or more processors of said one or more computers to perform steps (a) and (b).

According to a third aspect of the invention, there is provided a method of determining, using one or more computers, a medial axis of a virtual object, said method comprising:
 (a) by said one or more computers, determining an incomplete medial axis having at least some discrete points that are spaced apart from one another; and
 (b) by said one or more computers, ordering said discrete points into nearest neighbors by:
  calculating Delaunay triangles whose vertices are defined by said discrete points, each Delaunay triangle comprising three Delaunay edges, each of which spans between a respective pair of said discrete points;
  for each Delaunay edge spanning between said respective pair of said discrete points, determining whether any other of said discrete points resides within a respective sphere whose diameter is coincident with said Delaunay edge;

for each Delaunay edge for which no other discrete points reside within the respective sphere, identifying the respective pair of said discrete points spanned by said Delaunay edge as a pair of nearest neighbors; and (c) by said one or more computers, calculating an interpolation between said pair of nearest neighbors; and (d) by said one or more computers, using said interpolation between said pair of nearest neighbors to fill in a missing gap in the incomplete medial axis.

According to a fourth aspect of the invention, there is provided a method of smoothing a medial axis of a virtual object, said method comprising, by one or more computers, (a) grouping points of said one of the common axes into neighbourhoods, and (b) for each neighbourhood containing more than two points, replacing said more than two points with a singular point at an average location of said more than two points.

BRIEF DESCRIPTION OF THE DRAWINGS

Preferred embodiments of the invention will now be described in conjunction with the accompanying drawings in which.

DETAILED DESCRIPTION

The concepts applied for 2D medial axis extraction (discussed above in the background), are similarly put to use in preferred embodiments of the present invention to extract the medial axis of any continuous 3D image. More specifically, the present invention uses the notion that 3D images or virtual 3D objects can be divided into multiple 2D images—which allows the 2D algorithms to be applied (separately) on each 2D image—before finding the common intersection points of the 2D images, which represent the medial axis of the original 3D image or object.

Figure 10:
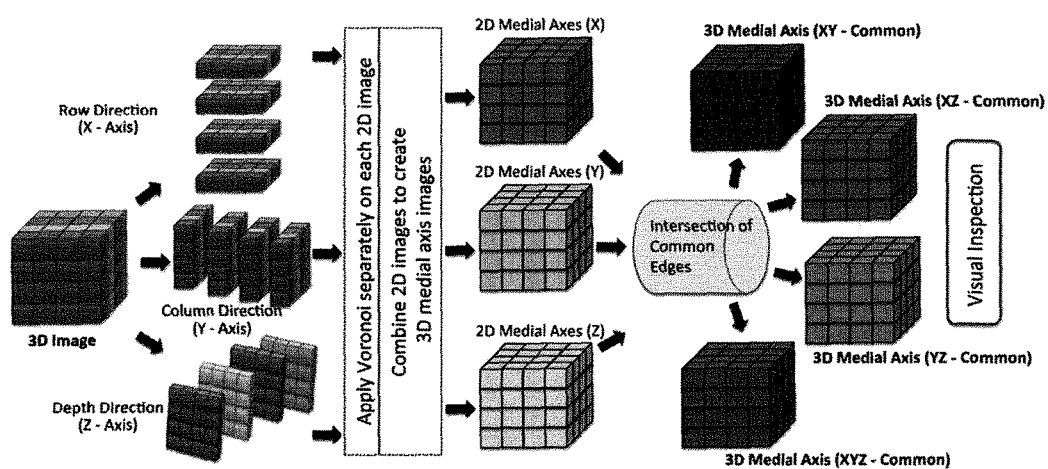
FIG. 10 shows a flow chart for extracting a medial axis from a virtual 3D object according to a preferred method of the present invention.

A 'divide and conquer' approach is thus employed herein for such 3D medial axis extraction. With specific reference to FIG. 10, first, the 3D image (also referred to herein as a virtual 3D object) is sliced into multiple 2D images in the X, Y and Z directions. So, the fully intact object at the left side of the Figure is subject to multiple cuts or slices in three different directions. In one slicing stage, multiple slices are made through the object in a "row direction" or "X-direction" running parallel to the X-Z reference plane bound between the X and Y axes of the virtual 3D Cartesian space in which the object resides. This divides the object into a plurality of 2D images each residing in a respective X-Z plane parallel to the X-Z reference plane at a respective height along the Y-axis. In another slicing stage, multiple slices are made through the object in a "column direction" or "Y-direction" running parallel to the Y-Z reference plane bound between the Y and Z axes of the virtual 3D Cartesian space, which thus divides the object into a plurality of 2D images each residing in a respective Y-Z plane parallel to the reference Y-Z plane at a respective point along the X-axis. In the remaining slicing stage, multiple slices are made through the object in a "depth direction" or "Z-direction" running parallel to the X-Y reference plane bound between the X and Y axes of the virtual Cartesian space, which divides the object into a plurality of 2D images each residing in a respective X-Y plane parallel to the X-Y reference plane at a respective point along the Z-axis.

Then the Voronoi algorithm, discussed above in the background section, is used to extract a respective 2D medial axis from each of the resulting 2D images, thus resulting in a set of X-direction medial axes each residing in a respective one of the X-Z image planes, a set of Y-direction medial axes each residing in a respective one of the Y-Z image planes, and a set of Z-direction medial axes each residing in a respective one of the X-Y image planes.

After doing this, the extracted 2D medial axes are stacked with respective to their corresponding slicing direction to create their respective 3D medial axes (called the X-, Y- and Z-direction medial axes). That is, a version the 3D image incorporating these 2D medial axes is effectively assembled by assembling the 2D images (that now have the respective 2D medial axes incorporated therein or mapped thereon) according the the positions and orientations from which the 2D images were respectively taken from the original 3D image.

It will be appreciated that no actual slicing/deconstruction and re-assembly/reconstitution actually occurs since the object is virtual (i.e. represented by object data in the computer memory of the computer or computers performing these tasks), but the physical metaphor is made for the purpose of clearly conveying the effective manipulation that would be occurring if similar 'slicing' of a physical real world object into 2-dimensional planar images (i.e. thin sheets or layers) were performed. In the computerized context, where the object and images are 'virtual' in the sense that their physical characteristics are represented by data, and not by a physical entity actually bearing those characteristics, it will be appreciated that rather than an actual reconstruction of the 3D images once the 2D medial axes have been extracted from the 2D images, each of the three sets of 2D medial axes that have been determined are instead mapped to the virtual 3D space according to the positions and orientations from which the respective 2D images were obtained, points at which the given set of 2D medial axes intersects.

Next, the common skeleton between these three (X-, Y- and Z-direction) intermediate medial axis images is then determined from the intersections between any two directions (XY-, YZ-, ZX-common), as well as the intersections between all three directions (XYZ-common). That is, a common XY skeleton is determined as the points in the virtual 3D space at which the X-direction medial axes intersect with the Y-direction medial axes, a common YZ skeleton is determined as the points in the virtual 3D space at which the Y-direction medial axes intersect with the Z-direction medial axes, a common ZX skeleton is determined as the points in the virtual 3D space at which the Z-direction medial axes intersect with the X-direction medial axes, and a common XYZ skeleton is determined as the points in the virtual 3D space at which the X-direction medial axes intersect with both the Y-direction medial axes and the Z-direction medial axes.

In a first partially-automated embodiment that requires human intervention at this point in the process, each of these four common skeletons, each denoting a respective 3D medial axis, are visually overlaid on the original 3D virtual object, and displayed to a user (for example, on an integral or peripheral display monitor of the computer, a projection screen or backdrop from a projector, on a physical print-out generated by a peripheral printer connected thereto, etc.), whereupon the different skeletons are assessed by the user (via visual examination) to select the best one—i.e., the one that most accurately represents the skeleton of the original object, is only one-voxel thick, and has the lowest amount of redundant information.

A second embodiment is instead fully automated, and uses the same computer or computers used for the forgoing slicing operations to perform an automatic centerline section (ACS) routine that calculates which of the four common skeletons is the best candidate for selection as the final medial axis of the object. For each of the common skeletons, the ACS performs a quantitative analysis concerning neighbouring relationships between points of the skeleton, and uses the resulting numerical data to identify which of the common skeletons is the best representation of the object's true medial axis or centerline.

Figure 21:
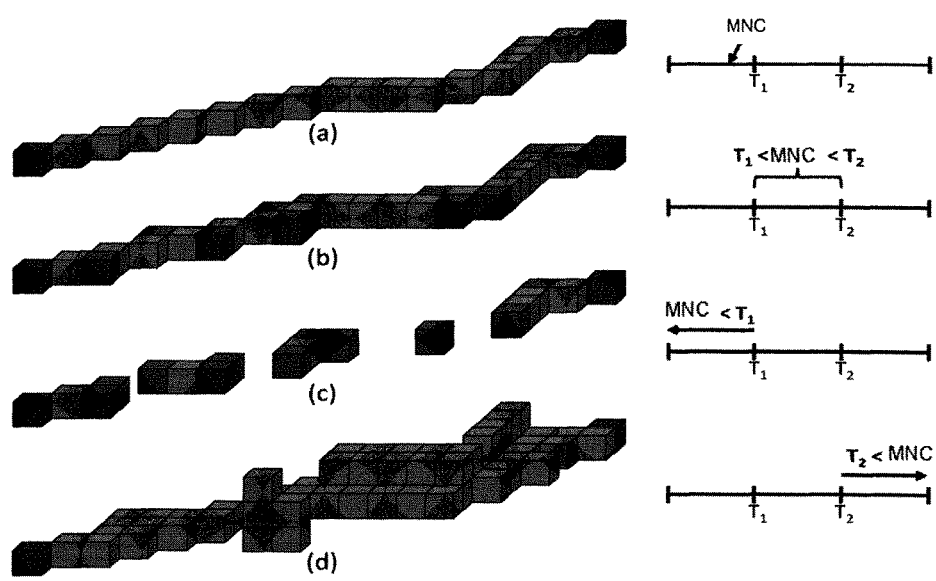
FIGS. 21(a) through 21(d) illustrate the difference between an ideal medial axis that is only one voxel thick, and less ideal medial axes having noise and/or gaps or discontinuities.

The routine determines a "neighbour count" for each point in the common skeleton, i.e. for each point in the common skeleton, count how many other points in the same common skeleton immediately neighbour said given point (i.e. are within one voxel of said given point). Once all the neighbour counts are completed for the given common skeleton, the neighbour count values of all the points in that common skeleton are averaged, thereby obtaining a mean neighbour count (MNC) of said common skeleton. An ideal medial axis will have a thickness of only one voxel, meaning that the MNC will be close to an integer value of 2. That is, every voxel of an ideal one-voxel thinned centerline will have only two neighbours, with the exception of the two terminal end points of the medial axis, each of which will have only one neighbour. In practical terms however, due to the presence of noise, the MNC of a common skeleton will deviate further from 2, and lie somewhere in a threshold range between $T_1$ and $T_2$, depending on the amount of noise. This is visually demonstrated in FIG. 21. A common skeleton having an MNC value between $T_1$ and $T_2$, is very close to an ideal one-voxel thinned medial axis, and thus can be selected as the best candidate for the object's medial axis.

The ACS includes additional criterion for the selection of the best candidate among the common skeletons. In the event that more than one of the common skeletons has an MNC value in the threshold range between $T_1$ and $T_2$, a Recovery Percentage (RP) is used to gauge the quality of these candidate skeletons against one another. For each of the candidate skeletons, the RP represents how much of the original object's volume is occupied by a union of maximally inscribed spheres (union of balls) along the candidate skeleton. It is known in the art to approximate the shape of the original object using such a union of balls. The disclosed ACS process uses this concept to gauge the quality of each candidate skeleton by generating a volume-approximating union of balls centered on the points of the candidate common skeleton. The RP of the common skeleton is then calculated as the number of voxels occupied by that skeleton's union of balls, divided by the number of voxel's occupied by the original object, multiplied by 100 in order to express the resulting value as a percentage.

$$RP = 100\left(\frac{\text{Number of voxels occupied by the union of balls}}{\text{Number of voxels occupied by the original object}}\right)$$

Figure 22:
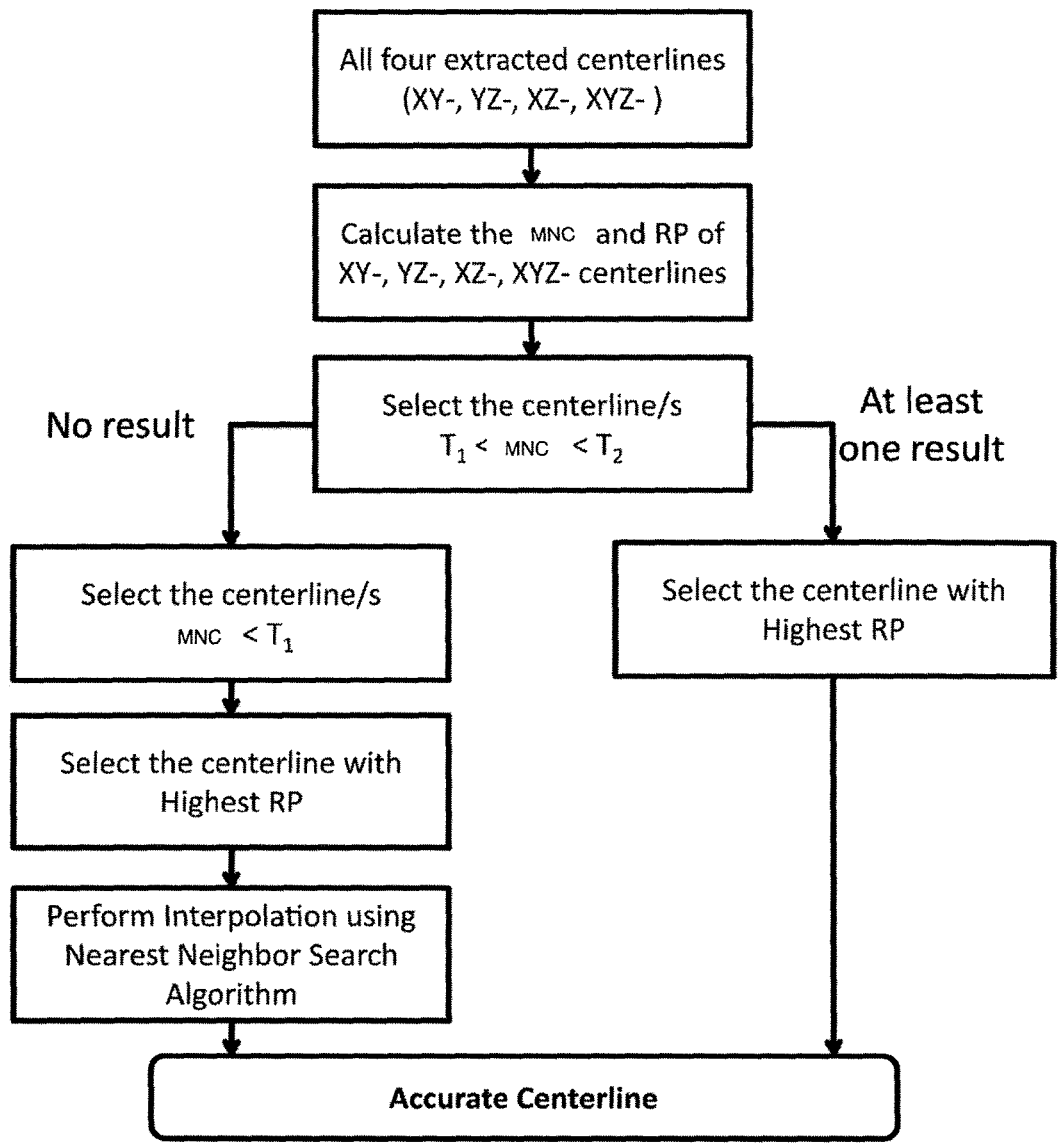
FIG. 22 is a schematic flow chart of an Automated Centerline Selection (ACS) process used to select a best centerline candidate that most closely resembles an ideal medial axis.

So, with reference to the flow chart schematic of FIG. 22, the ACS calculates the MNC value for each of the four common skeletons. Each common skeleton whose MNC value exceeds the upper limit of the threshold range $T_2$ is not a suitable candidate, and is thus disqualified from consideration, as it is not close enough to an ideal one-voxel thinned centerline. If only one of the four common skeletons has an MNC value within the threshold range, then this common skeleton is selected to represent the 3D medial axis of the object. If more than one of the common skeletons has an MNC value within the threshold range, then the common skeleton with the highest RP is selected to represent the 3D medial axis of the object. If none of the four common skeletons have an MNC value within the threshold range between $T_1$ and $T_2$, then the ACS selects the common skeleton(s) whose MNC value is below the lower limit of the threshold range $T_1$, thus representing a common skeleton in which there are gaps between its points. If more than one of the common skeletons has an MNC value is below the lower limit of the threshold range $T_1$, then the common skeleton with the highest RP among these below-range skeletons is selected, and then an interpolation routine, described below, is then performed to fill in these gaps in this selected common skeleton to generate a suitable medial axis of the object.

As mentioned above, and particularly in the case of complex 3D objects, the above disclosed skeletonization process can produce undesirable results in the form of incomplete skeletons with discontinuities (gaps, holes or voids) in the extracted 3D skeleton. To overcome this, use of interpolation is disclosed herein to create approximated segments or portions to fill in the discontinuities and provide a completed 3D skeleton. While such interpolation can be performed on each of the four common skeletons, embodiments using the above described ACS process may instead perform the interpolation process only on the finally selected "best" medial axis candidate from among the four common skeletons. However, there are challenges to overcome in providing an effective interpolation technique for 3D skeletonization, in response to which the following technique is proposed.

Given a set of distinct points $P=\{p_1, p_2, p_3 \ldots p_N\}$ in any space, an ideal condition of interpolation would be to have these points P arranged in either ascending or descending order. Under such conditions, any spline method could then be used to interpolate between consecutive points. However, points along the medial axis are not inherently arranged in order, so this must be done before interpolation can be performed. One common method of finding nearest neighbors is based on Euclidean distance; since smaller Euclidean distances between points generally means that those points have a higher likelihood of being neighbors. However, Euclidean distance is not the only factor when tracing a path, and other than the end points, all other points in the path will have two nearest neighbors, so a more sophisticated approach is needed.

The presently disclosed invention thus includes a novel technique for finding neighboring points if the given set of points P are not in order. Since Maus & Drange [40] proved that all closest neighbors are proper edges of their respective Delaunay triangles, the present embodiment identifies the edges of Delaunay triangles related to each point and to then applies a circular algorithm to identify the nearest neighbor, as follows.

Figure 1:
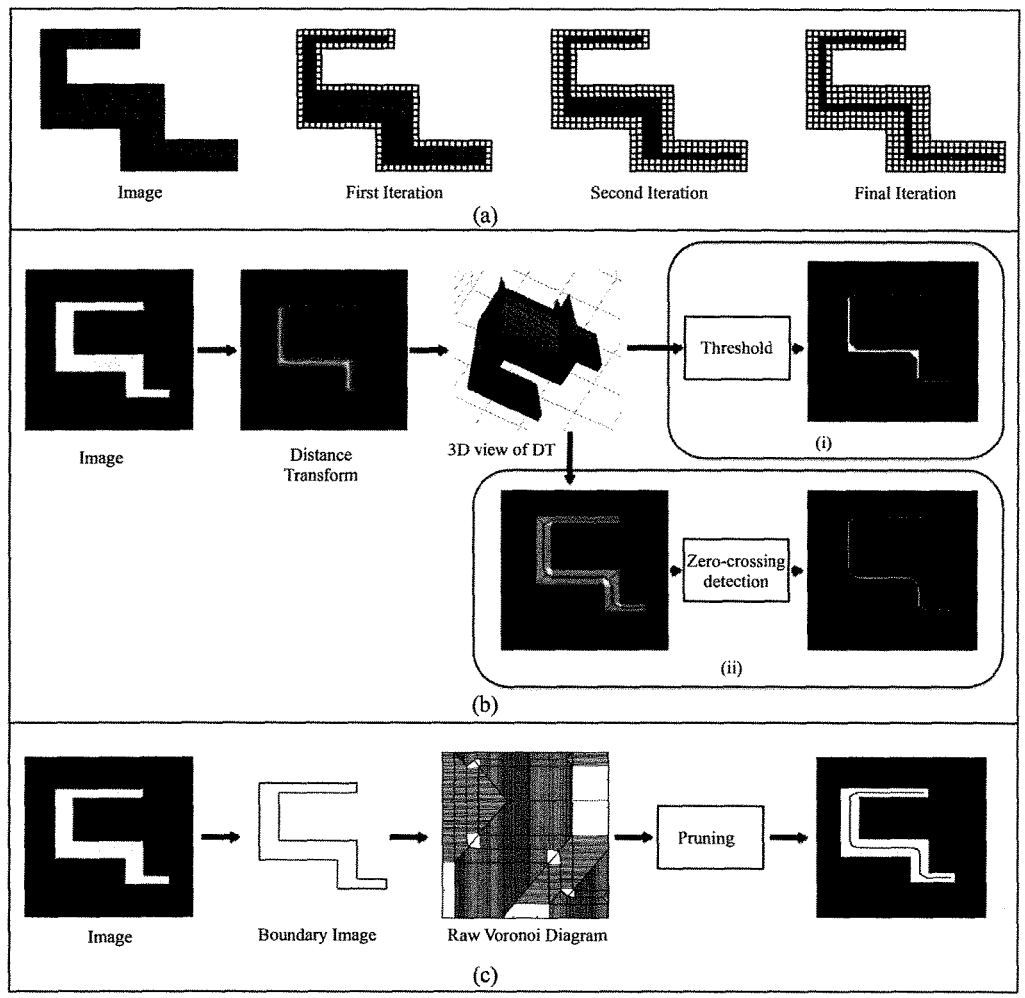
FIG. 1 schematically illustrates a main pipeline or workflow for different skeletonization algorithms in the prior art, namely (a) Boundary removal (b) Distance Transform (c) Voronoi Diagram.
Figure 2:
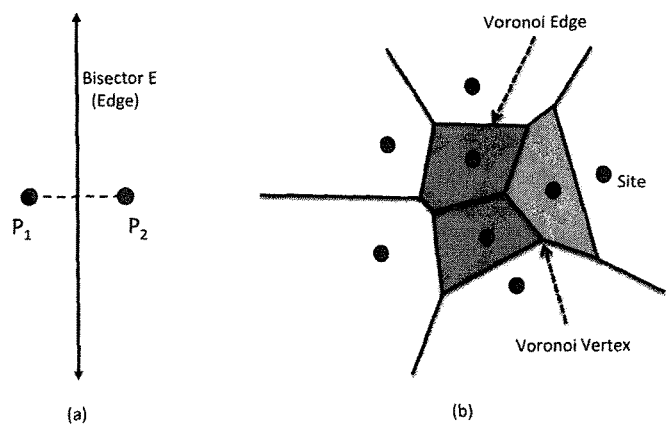
FIG. 2 schematically illustrates (a) division of space between two points, and (b) Voronoi diagram of n sites and its main components, in which shaded polygons are bounded cells, whereas others are unbounded cells.
Figure 3:
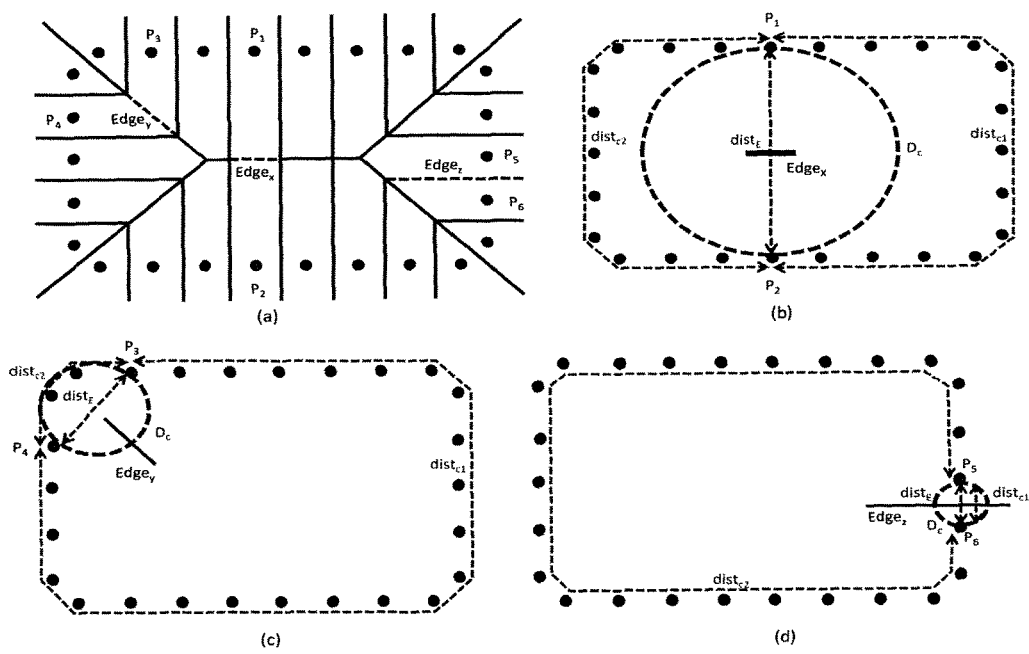
FIG. 3 schematically demonstrates a Pruning Process performed of Voronoi edges, where (a) shows a Raw Voronoi Skeleton of boundary points, (b) illustrates the Pruning process for Edge X, (c) illustrates the Pruning process for edge Y, and (d) illustrates the Pruning process for Edge Z.
Figure 4:
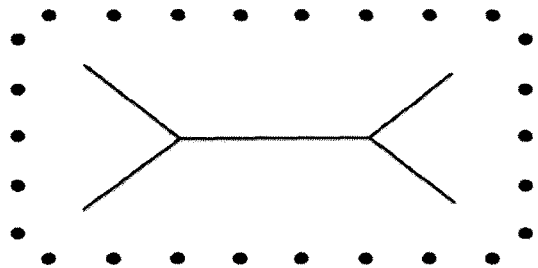
FIG. 4 schematically illustrates a refined skeleton after completion of the pruning process of FIG. 3.
Figure 5:
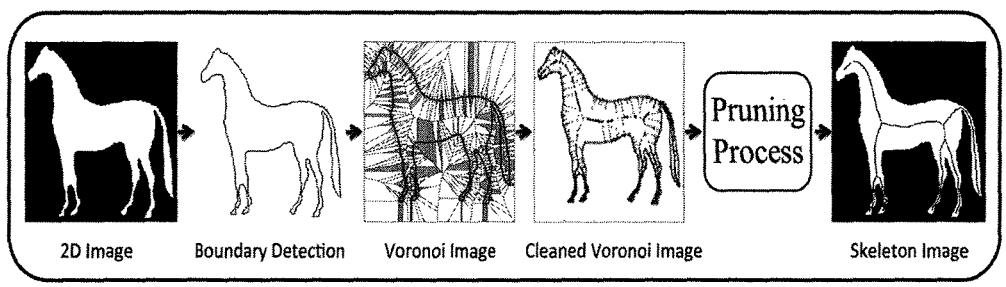
FIG. 5 is a block diagram of a 2D skeletonization procedure using a Voronoi diagram and subsequent pruning process.
Figure 6:
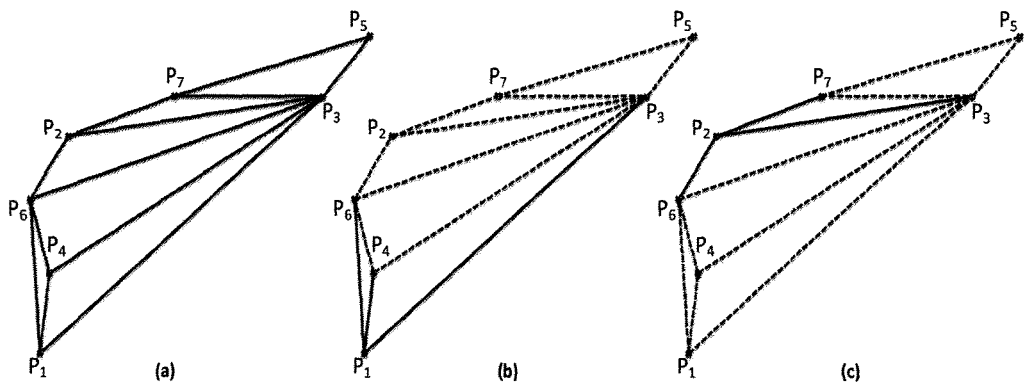
FIG. 6 illustrates, in (a), creation of Delaunay triangles for n points during a nearest neighbour technique employed in an interpolation process of the present invention for correct discontinuities in an extracted 3D medial axis, while (b) shows the Delaunay Triangle edges with respect to point $p_1$ and (c) shows the Delaunay Triangle edges with respect to point $p_2$.

The triangle whose vertices are formed by any three points $(p_i, p_j, p_k)$ from the given points in P is considered to be a Delaunay triangle if the circumscribed circle of this triangle does not contain any other points from P and these points $p_i$, $p_j$ and $p_k$ are on its circumference [40][41][42]. FIG. 6(*a*) shows the Delaunay triangulation D of the points P having $(p_1, p_2, p_3, p_4, p_5, p_6, p_7)$. The points P are not in sequence; so direct interpolation would yield incorrect results. Therefore, these points are first arranged according to their closest neighbors. FIGS. 6(*b*) and 6(*c*) show the Delaunay edges with respect to point $p_1$ and $p_2$, and all of the Delaunay edges with respect to every other point can be obtained in the same way.

Nearest neighbors can be found by checking each Delaunay edge using a circular algorithm [43]. According to this algorithm, points $p_i$ and $p_j$ are nearest neighbors if (and only if) no other points in P fall inside the circle whose diameter coincides with the Delaunay edge that spans between those points ($p_i$ & $p_j$). Otherwise, if any other points fall within the circle, they are not considered to be nearest neighbors.

Figure 7:
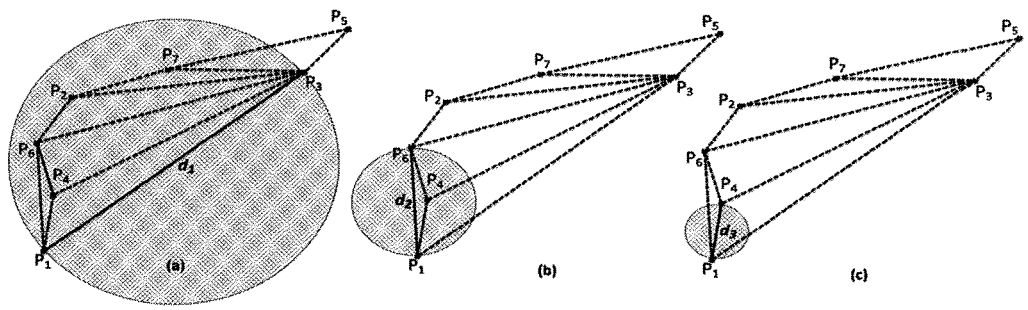
FIGS. 7(a) through 7(c) demonstrate a next step of the nearest neighbor technique with respect to point $P_1$ where a lack of other points in a circle whose diameter is coincident with a Delaunay edge denotes a nearest-neighbor relationship between the two points spanned by that Delaunay edge.

FIG. 7 demonstrates how the algorithm works for point $p_1$. Delaunay triangles indicate that $p_1$ makes triangle edges with points $p_3$, $p_4$ and $p_6$. It can be seen that points $p_1$ & $p_3$ are not nearest neighbors because several other points ($p_2$, $p_4, p_6, p_7$) from P fall inside the circle having diameter d (defined by the edge connecting $p_1$ & $p_3$). Similarly, the condition fails for points $p_1$ & $p_6$ because another point ($p_4$) from P lies inside the circle having diameter d (defined by the edge between $p_1$ & $p_6$). This proves that $p_1$ is not a nearest neighbor of $p_3$ or $p_6$. However, points $p_1$ and $p_4$ are nearest neighbors because no other points from P fall inside the circle formed by $p_1$ and $p_4$ (as shown in FIG. 7).

Figure 8:
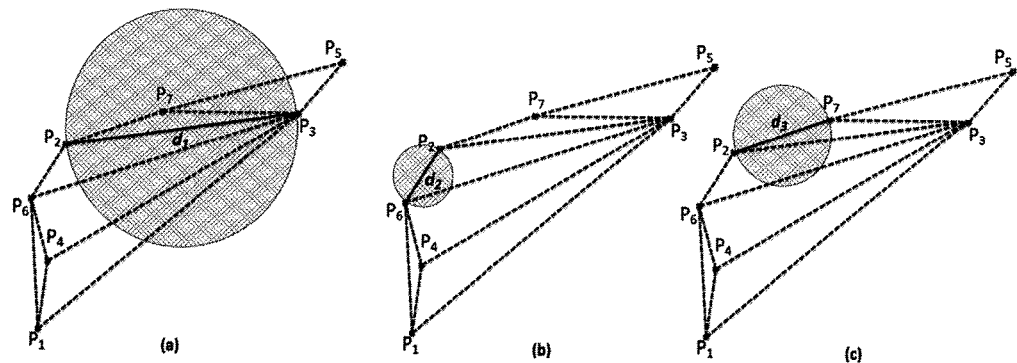
FIGS. 8(a) through 8(c) demonstrate the application of the circle test of FIG. 7 with respective to point $P_2$.

Likewise, out of the three Delaunay edges for point $p_2$ (i.e., connecting to points $p_3$, $p_6$ and $p_7$), points $p_6$ and $p_7$ are nearest neighbors on either side because no other points from P fall inside the circles bisected by either edge (FIG. 8*b,c*). However, $p_3$ is not considered to be a nearest neighbor of $p_2$, because another point ($p_7$) lies inside the circle bisected by the edge connecting $p_2$ and $p_3$ (as shown in FIG. 8*a*).

Figure 9:
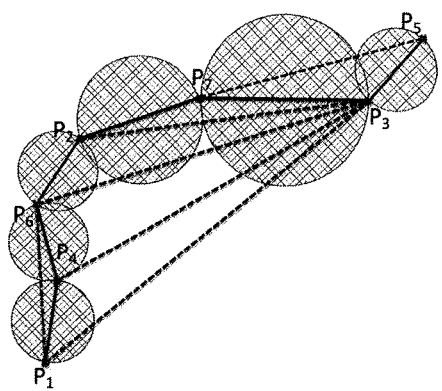
FIG. 9 illustrates the final result of the nearest neighbor search technique of FIGS. 6 to 8.

After checking each Delaunay triangle edge with respect to every starting point, only those edges are kept which satisfy the aforementioned nearest neighbor condition. FIG. 9 shows that P ($p_1,p_2,p_3,p_4,p_5,p_6,p_7$) can be easily arranged according to their nearest neighbors, where the arranged points are ($p_1,p_4,p_6,p_2,p_7,p_3,p_5$). Once the points are arranged, then interpolation can be done between each nearest neighbor pair by using any desired interpolation technique.

In the present context of a 3D medial axis requiring interpolation to remove discontinuities therein, e.g. a holes, gaps or voids between discrete points at which the common 2D medial axes have been found to intersect, because these discrete points are spread out in three-dimensional space, the aforementioned circle in the forgoing nearest neighbour process is not a two-dimensional circle, but rather a three-dimensional sphere.

In summary, the present embodiment of the present invention thus slices the 3D image or virtual object into 2D images in all three directions of the virtual 3D Cartesian space in which the object is contained, then performs 2D medial extraction on each sliced 2D image using a suitable known technique (e.g. the Voronoi method detailed herein), finds the intersections the directionally different 2D medial axes, which yields a number of candidate 3D medial axes, from among which human visual selection or automated selection of a best candidate is made, which if incomplete (i.e. possess discontinuities), can be completed by an interpolation process employing the Delaunay-based nearest neighbor technique disclosed above.

There are many applications for the unique 3D medial axis extraction process of the present disclosure, which may be compatible with any binary image. The virtual 3D object stored as data in the computer memory may have a physical real-world counterpart, for example having been derived from a scan of a real physical entity. This includes 3D scans of living organisms, including humans, for example using a magnetic resonant imaging (MRI) scanner, or computerized tomography (CT) scanner. On the other hand, the solutions disclosed herein are also applicable to applications lacking a physical counterpart from which the virtual object was derived, for example including computer-generated 3D graphics, or outputs from computational models.

One notable example of potential applications is in the medical field. In particular, there is an interest in extracting the medial axes of brain white matter regions (i.e., the structural wiring of the brain) to enable quantitative analyses along the tracts (e.g., by extracting various MRI measurements) to look for damage—such as Multiple Sclerosis lesions—anywhere along a particular white matter pathway. Similarly, the disclosed techniques it could also be used for automated blood vessel mapping to characterize various factors, including the number of branches, min/mean/median/max branch length, as well as the diameter and/or cross-sectional area along each branch (e.g., to flag potential stenoses, aneurysms, or things like tumor angiogenesis). Accordingly, the present invention finds particularly useful practical application in the areas of medical diagnostics, treatment and research.

Other applications are found in fields such as computer vision, Computer generated imagery, (CGI), or data science. For example, if a space exploration rover or other interplanetary vehicle scanned and modeled a canyon or some other geographic feature on remote planets or other astronomical bodies, and wanted to send the data back to Earth in a condensed form, it would likely be much more efficient to send a medial axis along with a distance transform, rather than the full 3D-rendered scan. This is just one example of where such data efficient formatting of scanned object data would be useful for more efficient data communication or other advantageous effect. Likewise, scanning by manned, remote controlled or autonomous equipment on Earth may be similarly be used for environmental exploration, mineral/resource surveying, archeological exploration, where geological formations, rocks, minerals, and archeological findings/remains may be scanned for medial axis extraction. Such applications may likewise find benefit in data efficiencies in terms of both storage and remote transmission of scanned object data.

Figure 19:
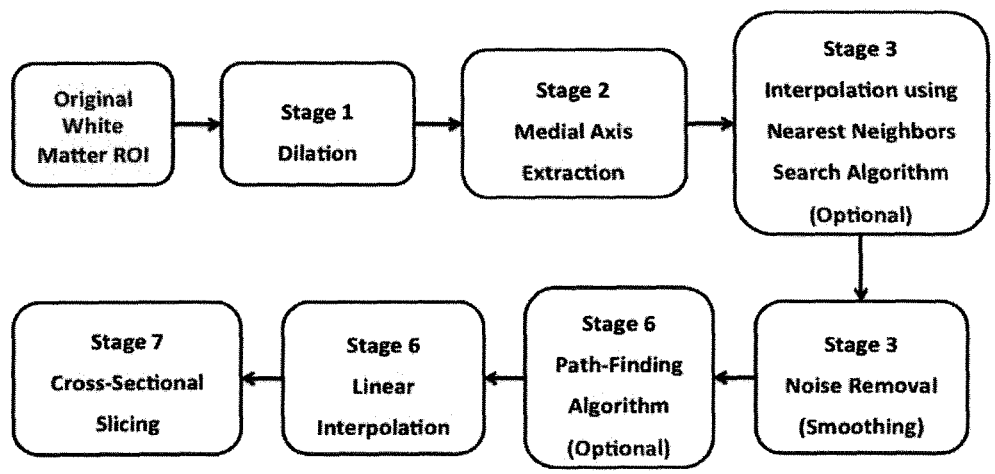
FIG. 19 illustrates the pipeline or workflow of a process for generating Quantitative Tract Integrity Profiles, which uses the 3D medial axes extraction process of FIG. 10 and the interpolation process using the nearest neighbor technique of FIGS. 6-9, and then applies a unique noise-removal/smoothing algorithm to the extracted medial axis.

As mentioned above, one particular application of interest is in extracting the medial axes of brain white matter regions (i.e., the structural wiring of the brain) to enable quantitative analyses along the tracts. In such applications, cross-sectional slicing of the tract is useful to create tract profiles. FIG. 19 shows the pipeline or workflow of a process for generating Quantitative Tract Integrity Profiles, which at stages 2 and 3 uses the forgoing 3D medial axis extraction techniques and optional interpolation-based discontinuity correction described above, and then at stage 4 applies a unique noise-removal/smoothing algorithm to the extracted medial axis using the same nearest-neighbour technique described above for the optional interpolation-based discontinuity correction. After extracting the medial axis, the cross-sectional planes are made in order to extract any quantitative white matter imaging values (e.g. fractional anisotropy, mean diffusivity, T1w/T2w ratio, magnetization transfer ratio etc.) along the fiber tract.

Figure 20:
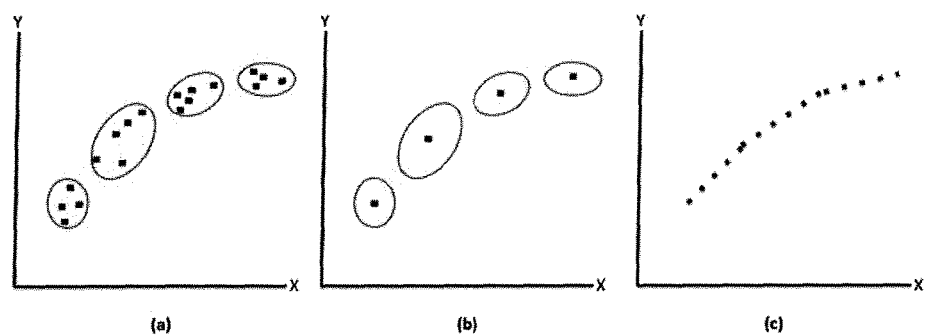
FIGS. 20(a) through 20(c) demonstrate the noise-removal/smoothing algorithm of FIG. 19, where points are grouped into neighbourhoods using the same Delaunay triangle and circle test employed in the nearest neighbor technique of FIGS. 6-9, and the points in each sufficiently populated neighborhood are replaced with a singular point at an average location of the original points to prepare the resulting point set for interpolation.

Although the extracted medial axis is continuous and one voxel thin after the discontinuity-correction of stage 3 of the FIG. 19 workflow in the optimal scenario, the medial axes still may not be smooth, and in fact may typically contain small offsets (zigzags). These offsets make it difficult to perform cross-sectional slicing in the appropriate direction due to high degree of variation in angle between adjacent points along the medial axis. This noise is removed by defining a 'neighborhood' of grouped together points using the above described nearest neighbor search algorithm using Delaunay triangles and Spherical checks, and then replacing the points within this neighbourhood with a singular point at the average location of the neighbourhood's original points, as illustrated in FIG. 20. Some of the information about the medial axis may also be removed along with the noise, creating wide gaps in the medial axis. These gaps are again filled using suitable (e.g. simple linear) interpolation at stage 6 of the FIG. 19 workflow.

So to remove the noise (zig-zags), first all the Delaunay triangles are calculated for all of the extracted medial axis points. A first given point is then selected, and surrounding points are then searched to identify those which successfully pass the Delauny edge spherical test, and those that pass the test are assigned to the same neighbourhood as the selected given point. A list of points for the given neighbourhood is populated by the points that pass the test.

In greater detail, the first given point is selected, and each surrounding point is tested to see whether a sphere whose diameter is coincident with the Delaunay edge that spans between the selected given point and the surrounding point in question contains any of the other points. If the sphere does not contain any other points, then this surrounding point passes the test, and is assigned to the same neighbourhood as the selected given point. If the sphere does contain another point, then this surrounding point fails the test, and is excluded from the neighbourhood of the selected given point. This process is repeated to test all surrounding points for neighbourhood qualification in relation to the selected given point. Once all points have been tested, if the neighbourhood list for this selected given point contains more than two points, then all points in that neighbourhood are replaced with a singular point at the average location of all the neighbourhood's original points. If the neighbourhood contains only one or two points, they are left as-is, and are not replaced with a singular point of averaged location.

The overall process is then repeated by selecting another given point, and then testing all other points that were excluded from the first neighbourhood for qualification in the second neighbourhood of the newly selected given point. This is repeated until all points have been assigned to respective neighbourhoods, whereby the medial axis is now made up of a collection of averaged-location points and any original location-points for which the neighbourhood size was less than three points. Interpolation is then performed between this remaining collection of points, thereby smoothing out the zigzags of the originally extracted medial axis.

In support of the utility of the present invention, three experiments were designed to test the performance of the algorithm discussed above. The first experiment evaluated the pruning process and the effects of control parameter T for removing excess medial axis branches, and also confirmed the stability of the Voronoi algorithm on standard 2D images. The second and third experiments then evaluated the overall performance of the 3D medial axis extraction algorithm on regular (i.e., smooth and continuous) 3D objects and highly complex 3D diffusion tensor magnetic resonance images (i.e., to illustrate potential applications to other 3D medical images), respectively. Each of these is discussed in detail below.

Experiment 1

Figure 11:
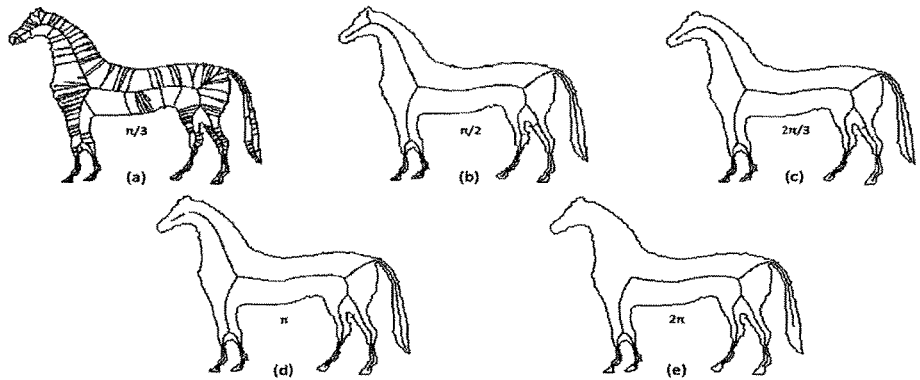
FIG. 11 shows experimental results from a first test of a 2D medial axis extraction process used in the present invention, with parts (a) through (e) demonstrating an effect of a variable pi-related factor during a pruning stage of the process.

The control parameter T used in (3) controls the strictness of the pruning process by determining the number of branches that are retained in the final extracted skeleton. In this case, lower values of it (e.g., $\pi/3$, $\pi/2$, $2\pi/3$) will retain more branches in the skeleton, while using higher values of it (such as $2\pi$) will remove more branches from the skeleton. FIG. 11 shows the effect of different values of $\pi$ on the skeleton.

Figure 12:
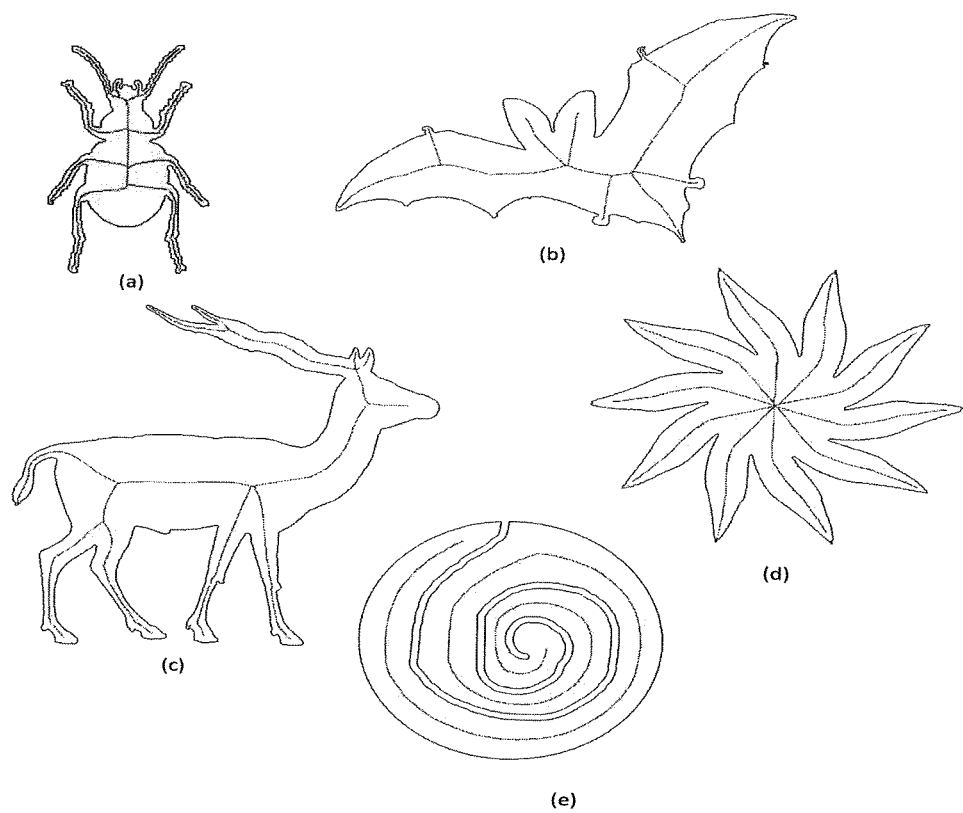
FIGS. 12(a) through 12(e) show additional results from the first test.

The stability of the Voronoi algorithm was then tested on a random assortment of 2D binary images taken from the benchmark MPEG-7 database [45]. For this experiment, different variations of control parameter were used in order to extract the skeleton of the respective image. FIG. 12 shows the results, which prove that the implemented 2D Voronoi algorithm accurately extracted the 2D skeletons for each image.

Experiment 2

Figure 13:
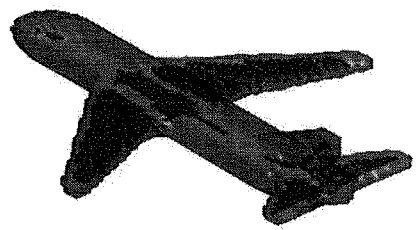
FIGS. 13(a) through 13(d) show experimental results from a second test of a 3D medial axis extraction process of FIG. 10, particularly showing four outputs from the process, where (a) shows a XY-common intersection, (b) shows a YZ-common intersection, (c) shows a ZX-common intersection, and (d) shows a XYZ-common intersection.
Figure 13:
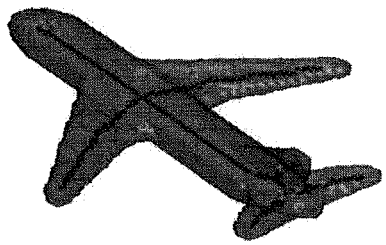
Figure 13:
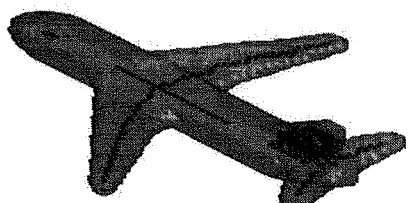
Figure 13:
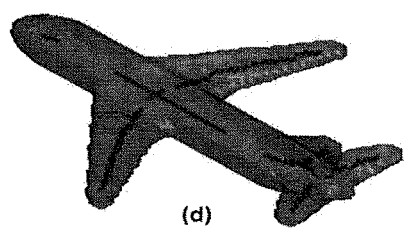
Figure 14:
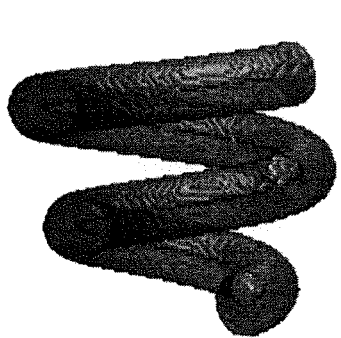
FIGS. 14(a) through 14(c) show additional results from the second test of the 3D Medial Axis extraction process of FIG. 10 on other smooth, continuous 3D images, namely (a) a Snake, (b) a Dolphin, and (c) a Human.
Figure 14:
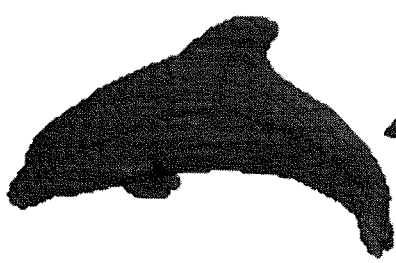
Figure 14:
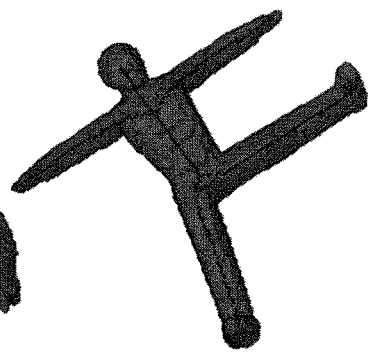

In this experiment, the complete Voronoi algorithm for 3D medial axis extraction was tested on a random assortment of smooth and continuous 3D binary images from the McGill 3D Shape Benchmark database [46]. For each 3D image, the algorithm produced four possible medial axes (FIG. 13), as discussed above in the methodology section. However, the most accurate among these (selected by visual examination) consistently demonstrated that the presently disclosed algorithm accurately extracted the connected medial axis and maintained the 3D topology of the original smoothed and continuous image (FIG. 14). With reference to FIG. 13, clearly The medial axis formed by the YZ-common intersection (b) is the only skeleton that is continuous, one voxel thin, and preserves the topology of the input image. Therefore, this is can be easily (visually) identified by the user and saved as the correct medial axis.

Experiment 3

After confirming that the 3D medial axis extraction algorithm consistently performed well on smooth and continuous 3D images, it was further desirable to identify whether it was robust enough for potential 3D medical imaging applications. Binary masks from medical images can be more complex than the previous benchmarking images due to lower resolution and less smooth, more irregular shapes. As a result, extracting medial axes for these kinds of images is a more complicated task.

Figure 15:
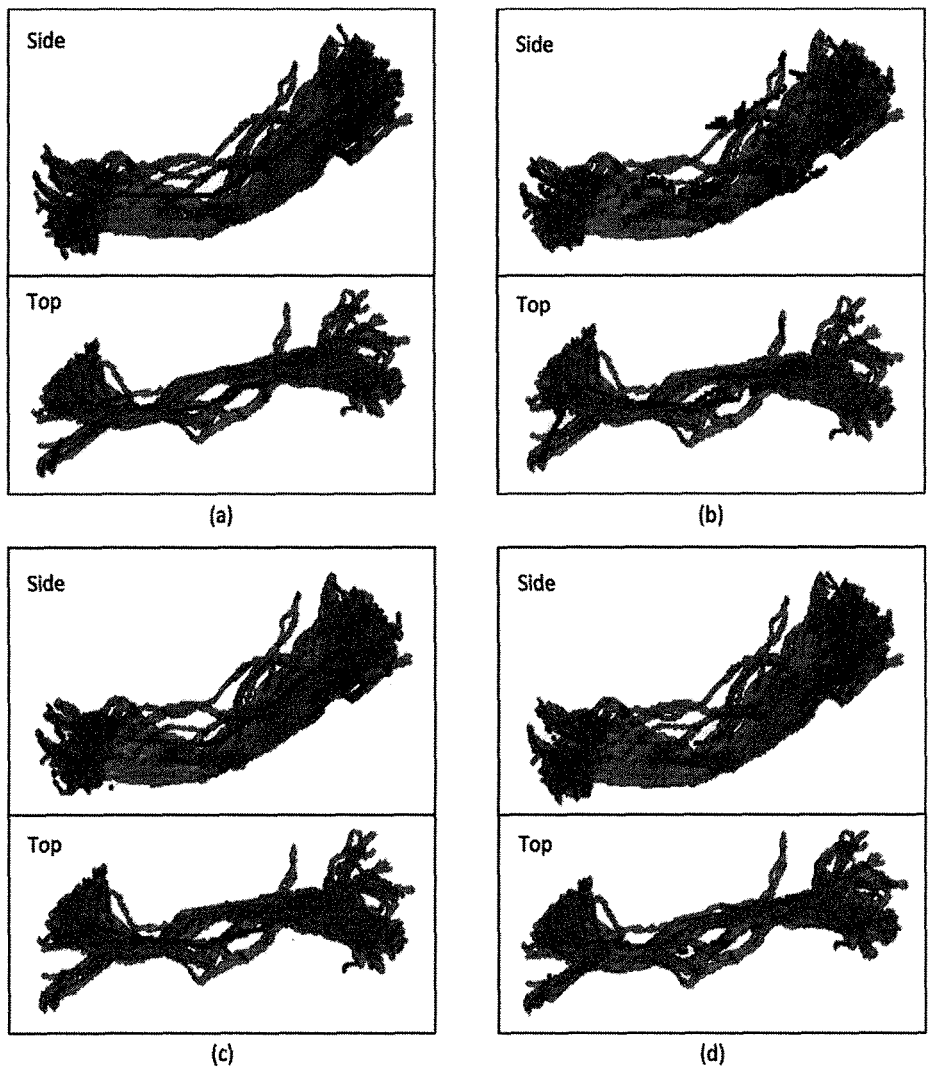
FIGS. 15(a) through 15(d) show experimental results from a third test of the 3D medial axis extraction process of FIG. 10, particularly showing all four outputs from the process, where (a) shows the XY-common intersection, (b) shows the YZ-common intersection, (c) shows the ZX-common intersection, and (d) shows the XYZ-common intersection.

In this experiment, the 3D medial axis extraction algorithm was subjected to a 'stress test' by evaluating its performance on human brain white matter atlases that were derived from diffusion tensor imaging data. Specifically, a random assortment of fiber tracts were chosen from the University of Manitoba & Johns Hopkins University Functionally-Defined White Matter Atlas [47] to test the algorithm. As shown in FIG. 15, the algorithm worked surprisingly well for most of the fiber tracts. Among the illustrated results of FIG. 15, clearly only the ZX-common intersection (c) resulted in a clean, continuous medial axis.

Figure 16:
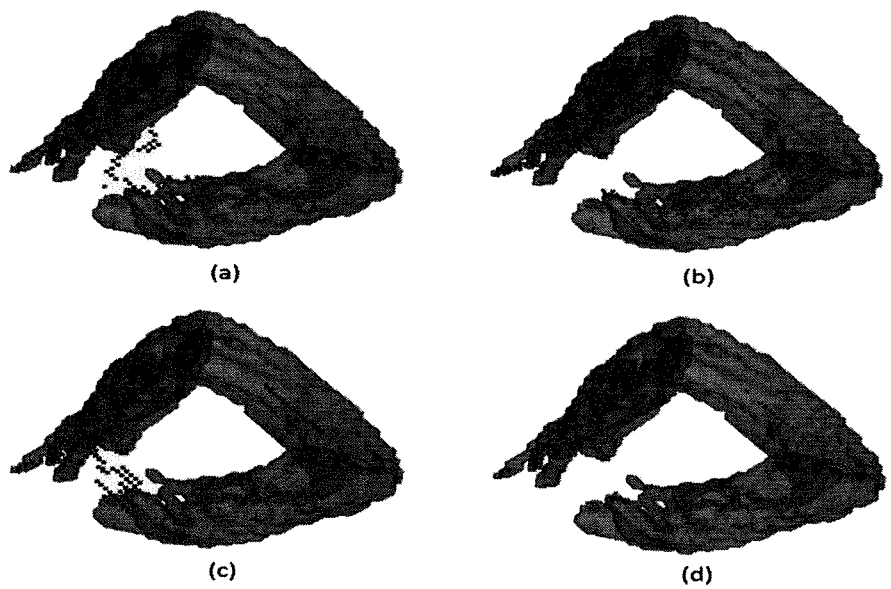
FIGS. 16(a) through 16(d) show additional results from the third test, particularly an example in which a Voronoi algorithm of the 3D medial axis extraction process alone failed to produce an accurate medial axis, as all four of the outputs contain either erroneous points or holes in extracted medial axis.

However, in some cases, the 3D Voronoi algorithm did not perform quite as well. It is evident in FIG. 16 that none of the four outputs represent an accurate medial axis (since each one contains erroneous points and/or holes in the extracted skeleton).

Figure 17:
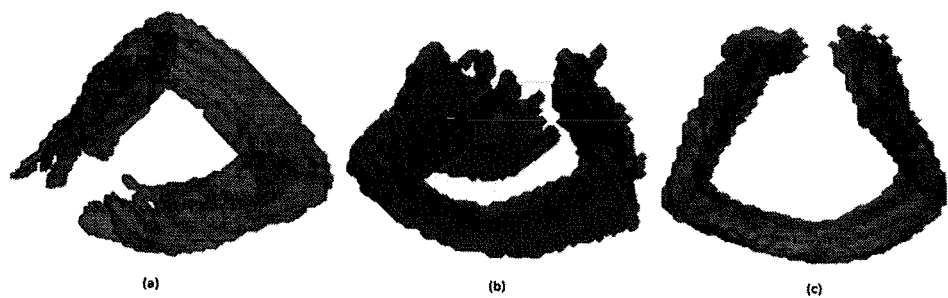
FIGS. 17(a) through 17(c) illustrate improved results for medial axis extraction from the same object as FIG. 16 after application of an additional interpolation process using the nearest neighbor technique of FIGS. 6-9, where (a) shows a front view of the object, (b) shows a back view thereof, and (c) shows a top view thereof, from which it can be seen that the discontinuities from FIG. 16 were eliminated to provide a continuous medial axis.
Figure 18:
FIGS. 18(a) through 18(d) illustrate additional test results for another object, where (a) & (b) show the results of the 3D media axis extraction process with the additional interpolation stage, while (c) shows pre-interpolation results from the ZX-common intersection, and (d) shows pre-interpolation results from the XYZ-common intersection.

Therefore, this represents a situation in which the optional interpolation algorithm is useful. Although it is an approximation of the medial axis in the regions with missing data, interpolating to effectively fill the holes in the XYZ-common medial axis (FIG. 16d) produces a continuous medial axis (FIG. 17) that mostly preserved the topology of the original image. Finally, other examples of white matter fibers requiring interpolation are shown in FIG. 18.

Overall, the results indicate that the proposed algorithm consistently extracts accurate medial axes from both 2D and 3D images, and that the algorithm is even robust enough to extract 3D skeletons from complex medical imaging data (especially when combined with the interpolation algorithm, when or if necessary).

Although the interpolation algorithm has a relatively high computational cost compared to the initial 3D medial axis extraction algorithm, the overall processing times for both the benchmark (Table 1) and complex medical images (Table 2) are still reasonably fast with modern computers— especially given that most medical images are analyzed off-line. For example, the processing times in Tables 1 and 2 were benchmarked on a fairly 'standard' laptop with a 2.2 GHz Intel i7 Quad-Core processor.

TABLE 1

Processing time for Smooth and Continuous Database.

| FIG. | Processing Time Skeleton Extraction (sec) |
|---|---|
| 2.13 | 8.11 |
| 2.14 (a) | 32.62 |
| 2.14 (b) | 10.02 |
| 2.14 (c) | 9.31 |

TABLE 2

Processing time for White Matter Atlases.

| FIG. | Processing Time Skeleton Extraction (sec) | Interpolation (sec) |
|---|---|---|
| 2.15 | 71.29 | Not Required |
| 2.16 & 2.17 | 15.17 | 94.72 |
| 2.18 (a) | 43.64 | 1038.68 |
| 2.18 (b) | 31.46 | 702.96 |
| 2.18 (c) | 24.18 | Not Required |
| 2.18 (d) | 44.53 | Not Required |

In summary, Applicant has developed and validated a useful methodology for extracting medial axes from 3D images. The method is based on a 'divide and conquer' approach, in which 3D images are first sliced along three different axes (height, width and depth) to create a series of 2D images in each plane. A Voronoi algorithm, or other suitable 2D medial axis extraction technique, is then applied to determine the medial axis of each 2D slice before the sliced images are recombined using an intersection technique to produce 3D medial axes images. An optional 3D interpolation algorithm has also been implemented to ensure that a continuous 3D medial axis can be extracted, even from complex 3D images (e.g., medical images). Finally, an axis-smoothing algorithm may be used to remove unwanted noise from the extracted medial axis.

Since various modifications can be made in my invention as herein above described, and many apparently widely different embodiments of same made, it is intended that all matter contained in the accompanying specification shall be interpreted as illustrative only and not in a limiting sense.

REFERENCES

[1] H. Blum and R. N. Nagel, "SYMMETRIC AXIS FEATURES," *Pattern Recognit.*, vol. 10, pp. 167-180, 1978.
[2] A. Sudhalkar, L. Gursijzt, and F. Prinzt, "Box-skeletons of discrete solids," *Comput. Des.*, vol. 26, pp. 507-517, 1966.
[3] D. J. Sheehy, C. G. Armstrong, and D. J. Robinson, "Shape description by medial surface construction," *IEEE Trans. Vis. Comput. Graph.*, vol. 2, no. 1, pp. 62-72, 1996.
[4] S. Tian, P. Shivakumara, T. Q. Phan, and C. L. Tan, "Scene character reconstruction through medial axis," in *Proceedings of the International Conference on Document Analysis and Recognition, ICDAR*, 2013, pp. 1360-1364.
[5] S. Tian, P. Shivakumara, T. Q. Phan, T. Lu, and C. L. Tan, "Character shape restoration system through medial axis points in video," *Neurocomputing*, vol. 161, pp. 183-198, 2015.
[6] S. Pizer, K. Siddiqi, and P. Yushkevich, *Medial Representations*, vol. 37.2008.
[7] P. A. Maragos and R. W. Schafer, "Morphological Skeleton Representation and Coding of Binary Images," *IEEE Trans. Acoust.*, vol. 34, no. 5, pp. 1228-1244, 1986.
[8] B. K. Jang and R. T. Chin., "One-pass parallel thinning analysis, properties, and quantitative evaluation," *EEE Trans. Pattern Anal. Mach. Intell.*, vol. 11, pp. 1129-1140, 1992.
[9] L. Lam and C. Y. Suen, "Evaluation of parallel thinning algorithms for character recognition," *IEEE Trans. Pattern Anal. Mach. Intell.*, vol. 17, no. 9, pp. 914-919, 1995.
[10] L. Lam and S. W. Lee, "Thinning methodologies—a comprehensive survey," *IEEE Transactions on Pattern Analysis and Machine Intelligence*, vol. 14, no. 9. pp. 869-885, 1992.
[11] C. J. Hilitch, "Linear Skeletons From Square Cupboards," *Mach. Intell.* 4, pp. 403-420, 1969.
[12] W. Xie, R. P. Thompson, and R. Perucchio, "A topology-preserving parallel 3D thinning algorithm for extracting the curve skeleton," *Pattern Recognit.*, vol. 36, no. 7, pp. 1529-1544, 2003.
[13] Y. Zhou and A. W. Toga, "Efficient skeletonization of volumetric objects," *IEEE Trans. Vis. Comput. Graph.*, vol. 5, no. 3, pp. 196-209, 1999.
[14] W. P. Choi, K. M. Lam, and W. C. Siu, "Extraction of the Euclidean skeleton based on a connectivity criterion," *Pattern Recognit.*, vol. 36, no. 3, pp. 721-729, 2003.
[15] F. Leymarie and M. D. Levine, "Simulating the Grassfire Transform Using an Active Contour Model," *IEEE Trans. Pattern Anal. Mach. Intell.*, vol. 14, no. 1, pp. 56-75, 1992.
[16] N. Ahuja and J. H. Chuang, "Shape representation using a generalized potential field model," *IEEE Trans. Pattern Anal. Mach. Intell.*, vol. 19, no. 2, pp. 169-176, 1997.
[17] H. Xia and P. G. Tucker, "Fast equal and biased distance fields for medial axis transform with meshing in mind," *Appl. Math. Model.*, vol. 35, no. 12, pp. 5804-5819, 2011.
[18] R. Kimmel and R. Maurer, "Method of computing sub-pixel euclidean distance maps," 2003.
[19] P. E. Danielsson, "Euclidean distance mapping," *Comput. Graph. Image Process.*, vol. 14, no. 3, pp. 227-248, 1980.
[20] C. Arcelli and G. S. Di Baja, "A width-independent fast thinning algorithm.," *IEEE Trans. Pattern Anal. Mach. Intell.*, vol. 7, no. 4, pp. 463-474, 1985.
[21] J. M. Gauch and S. M. Pizer, "Multiresolution Analysis of Ridges and Valleys in Grey-Scale Images," *IEEE Trans. Pattern Anal. Mach. Intell.*, vol. 15, no. 6, pp. 635-646, 1993.
[22] R. L. Ogniewicz and O. Kubler, "Hierarchic Voronoi skeletons," *Pattern Recognit.*, vol. 28, no. 3, pp. 343-359, 1995.
[23] N. Mayya and V. T. Rajan, "Voronoi diagrams of polygons: A framework for shape representation," *Comput. Vis. Pattern Recognition*, 1994. *Proc. CVPR '94.*, 1994 IEEE Comput. Soc. Conf., vol. 378, pp. 1-32, 1994.
[24] N. Mayya and V. T. Rajan, "An efficient shape representation scheme using Voronoi skeletons," *Pattern Recognit. Lett.*, vol. 16, no. 2, pp. 147-160, 1995.
[25] J. W. Brandt and V. R. Algazi, "Continuous skeleton computation by Voronoi diagram," *CVGIP Image Underst.*, vol. 55, no. 3, pp. 329-338, 1992.
[26] P. K. Saha, G. Borgefors, and G. Sanniti di Baja, "A survey on skeletonization algorithms and their applications," *Pattern Recognit. Lett.*, vol. 76, pp. 3-12, 2016.
[27] H. Liu, Z.-H. Wu, X. Zhang, and D. F. Hsu, "A skeleton pruning algorithm based on information fusion," *Pattern Recognit. Lett.*, vol. 34, no. 10, pp. 1138-1145, 2013.
[28] N. Amenta and R. K. Kolluri, "The medial axis of a union of balls," *Comput. Geom. Theory Appl.*, vol. 20, no. 1-2, pp. 25-37, 2001.
[29] F. Mokhtarian and A. K. Mackworth, "A theory of multiscale, curvature-based shape representation for planar curves.pdf," *IEEE Transactions on Pattern Analysis and Machine Intelligence*, vol. 14, no. 8. p. 789, 1992.
[30] F. Aurenhammer, "Voronoi diagrams," *ACM Comput. Surv.*, vol. 23, no. 3, p. 94, 1991.

[31] F. Aurenhammer, "Voronoi Diagrams—A Survey of a Fundamental Data Structure," *ACM Comput. Surv.*, vol. 23, no. 3, pp. 345-405, 1991.

[32] L. Guibas and J. Stolfi, "Primitives for the manipulation of general subdivisions and the computations of Voronoi diagrams," *ACM Trans. Graph*, vol. 4, no. April, pp. 74-123, 1985.

[33] D. E. Muller and F. P. Preparata, "Finding the intersection of two convex polyhedra," *Theor. Comput. Sci.*, vol. 7, no. 2, pp. 217-236, 1978.

[34] P. J. Green and R. Sibson, "Computing dirichlet tessellations in the plane," *Comput. J.*, vol. 21, no. 2, pp. 168-173, 1978.

[35] T. Ohya, M. IN, and K. Murota, "Improvements of the incremental method for the Voronoi diagram with computational comparison of various algorithms," *J. Oper. Res. Soc. Japan.*, vol. 27, no. 4, pp. 306-336, 1984.

[36] K. Sugihara and M. Iri, "Construction of the Voronoi Diagram for 'One Million' Generators in Single-Precision Arithmetic," *Proc. IEEE*, vol. 80, no. 9, pp. 1471-1484, 1992.

[37] M. I. Shamos and D. Hoey, "Closest-point problems," *Found. Comput. Sci.* 1975., 16th Annu. Symp., pp. 151-162, 1975.

[38] K. Q. Brown, "Algorithms for Reporting and Counting Geometric Intersections," *IEEE Trans. Comput.*, vol. C-30, no. 2, pp. 147-148, 1981.

[39] H. Spontón and J. Cardelino, "A Review of Classic Edge Detectors," *Image Process. Line*, vol. 5, pp. 90-123, 2015.

[40] A. Maus and J. Drange, "All closest neighbors are proper Delaunay edges generalized, and its application to parallel algorit," *Nor. Inform.*, pp. 1-12, 2010.

[41] M. De Berg, O. Cheong, M. Van Kreveld, and M. Overmars, *Computational Geometry: Algorithms and Applications*, vol. 17. 2008.

[42] G. Farin, D. Hoffman, and C. R. Johnson, "Triangulations and Applications," *New York*, 2006.

[43] D. T. Lee and B. J. Schachter, "Two algorithms for constructing a Delaunay triangulation," *Int. J. Comput. Inf. Sci.*, vol. 9, no. 3, pp. 219=242, 1980.

[44] A. Telea and J. J. van Wijk, "An augmented Fast Marching Method for computing skeletons and centerlines," *Jt. EUROGRAPHICS—IEEE TCVG Symp. Vis.*, pp. 251-260, 2002.

[45] X. Bai, X. Yang, L. J. Latecki, W. Liu, and Z. Tu, "Learning context-sensitive shape similarity by graph transduction," *IEEE Trans. Pattern Anal. Mach. Intell.*, vol. 32, no. 5, pp. 861-874, 2010.

[46] K. Siddiqi, J. Zhang, D. MacRini, A. Shokoufandeh, S. Bouix, and S. Dickinson, "Retrieving articulated 3-D models using medial surfaces," *Mach. Vis. Appl.*, vol. 19, no. 4, pp. 261-275, 2008.

[47] T. D. Figley, N. Bhullar, S. M. Courtney, and C. R. Figley, "Probabilistic atlases of default mode, executive control and salience network white matter tracts: an fMRI-guided diffusion tensor imaging and tractography study," *Front. Hum. Neurosci.*, vol. 9, no. November, p. Article 585, 2015.

The invention claimed is:

1. A method of determining, using one or more computers, a 3D medial axis of a virtual 3D object occupying a virtual 3D Cartesian space, said method comprising:
    (a) in any order, by said one or more computers,
        (i) virtually slicing through said virtual 3D object in a row direction parallel to a reference X-Z plane of said 3D Cartesian space at points along a Y-axis of said virtual 3D Cartesian space to generate a plurality of 2D images in X-Z planes, and determining respective X-direction medial axes for said 2D images in the X-Z planes;
        (ii) virtually slicing through said virtual 3D object in a column direction parallel to a reference Y-Z plane of said 3D Cartesian space at points along an X-axis of said virtual 3D Cartesian space to generate a plurality of 2D images in Y-Z planes, and determining respective Y-direction medial axes for said 2D images in the Y-Z planes; and
        (iii) virtually slicing through said virtual 3D object in a depth direction parallel to a reference X-Y plane of said 3D Cartesian space at points along a Z-axis of said virtual 3D Cartesian space to generate a plurality of 2D images in X-Y planes, and determining respective Z-direction medial axes for said 2D images in the X-Y planes;
    (b) by said computer, determining at least one common skeleton based at least partly on points of intersection between the X-direction medial axes, Y-direction medial axes and/or Z-direction medial axes.

2. The method of claim 1 wherein step (b) comprises, in any order, by said one or more computers,
    (i) determining a common XY skeleton based at least partly on points of intersection between the X-direction medial axes and the Y-direction medial axes;
    (ii) determining a common YZ skeleton based at least partly on points of intersection between the Y-direction medial axes and the Z-direction medial axes;
    (iii) determining a common ZX skeleton based at least partly on points of intersection between the Z-direction medial axes and the X-direction medial axes.

3. The method of claim 2 wherein step (b) further comprises, by the computer, (iv) determining a common XYZ skeleton based at least partly on points of intersection between the X-direction medial axes, the Y-direction medial axes and the Z-direction medial axes.

4. The method of claim 1 wherein step (b) comprises determining a common XYZ skeleton based at least partly on points of intersection between the X-direction medial axes, the Y-direction medial axes and the Z-direction medial axes.

5. The method of claim 1 comprising step (c), in which said one or more computers performs automated selection of a best candidate from among a plurality of common skeletons, and said automated selection comprises calculating a mean neighbour count for each of said plurality of common skeletons and comparing the mean neighbour count of said of said plurality of common skeletons against a threshold range that approximates an ideal neighbour count value.

6. The method of claim 1 wherein said points of intersection include at least some discrete points that are spaced apart from one another, and step comprises using interpolation between one or more nearest neighboring pairs of said discrete points to calculate one or more approximated portions of the at least one common skeleton.

7. The method of claim 1 wherein said points of intersection include at least some discrete points that are spaced apart from one another, and step comprises:
    ordering said discrete points into nearest neighbors by:
        calculating Delaunay triangles whose vertices are defined by said discrete points, each Delaunay triangle comprising three Delaunay edges, each of which spans between a respective pair of said discrete points;

for each Delaunay edge spanning between said respective pair of said discrete points, determining whether any other of said discrete points resides within a respective sphere whose diameter is coincident with said Delaunay edge;

for each Delaunay edge for which no other discrete points reside within the respective sphere, identifying the respective pair of said discrete points spanned by said Delaunay edge as a pair of nearest neighbors; and calculating an approximated portion of at least one skeleton as an interpolation between said pair of nearest neighbors.

8. The method of claim 1 further comprising smoothing at least one of said common axes, said smoothing comprising grouping points of said one of the common axes into neighbourhoods, and for each neighbourhood containing more than two points, replacing said more than two points with a singular point at an average location of said more than two points.

9. The method of claim 1 further comprising smoothing at least one of said common axes, said smoothing comprising grouping points of said one of the common axes into neighbourhoods, and for each neighbourhood containing more than two points, replacing said more than two points with a singular point at an average location of said more than two points, wherein said grouping of said points comprises:

(A) calculating Delaunay triangles whose vertices are defined by said points, each Delaunay triangle comprising three Delaunay edges, each of which spans between a respective pair of said points;

(B) for a selected point,
  (i) identifying any surrounding point for which a respective Delaunay edge spanning between said selected point and said surrounding point defines a diameter of a respective sphere that does not contain any other of said points, and adding said any surrounding point to a respective neighbourhood of said selected point; and
  (ii) identifying any surrounding point for which the respective Delaunay edge spanning between said selected point and said surrounding point defines a diameter of a respective sphere that does contain another of said points, and excluding said any surrounding point from the respective neighbourhood of said selected point; and wherein said replacing of said more than two points with said singular point at said average location of said more than two points is performed for the respective neighborhood of the selected point upon completion of step (B), prior to subsequent repetition of step (B) for another selected point.

10. Non-transitory computer-readable memory having stored thereon statements and instructions configured for execution by one or more processors of said one or more computers to perform steps (a) and (b) of claim 1.

11. A system comprising one or more computers having one or more processors and non-transitory computer readable memory coupled thereto, said non-transitory computer readable memory having stored thereon statements and instructions configured for execution by one or more processors of said one or more computers to perform steps (a) and (b) of claim 1.

12. The method of claim 1 comprising, before step (a), generating said virtual object by scanning a real-world physical entity with a 3D scanner.

13. The method of claim 12 wherein the real-world physical entity comprises an archeological finding.

14. The method of claim 12 wherein the real-world physical entity comprises a geographic formation.

15. The method of claim 12 wherein the real-world physical entity comprises a mineral deposit.

16. The method of claim 12 wherein the real-world physical entity is a living organism.

17. The method of claim 16 wherein the real-world physical entity is a human being.

18. The method of claim 16 wherein the 3D scanner is a magnetic resonance imaging scanner.

19. The method of claim 16 wherein the 3D scanner is a computerized tomography scanner.

20. The method of claim 16 further comprising using the 3D medial axis as a virtual map of a tract or pathway in a body of the living organism.

* * * * *